United States Patent
Donabedian

[11] Patent Number: 5,358,080
[45] Date of Patent: Oct. 25, 1994

[54] REINFORCED BRAKE ROTOR

[75] Inventor: Edgar E. Donabedian, Dearborn, Mich.

[73] Assignee: The Budd Company, Troy, Mich.

[21] Appl. No.: 987,627

[22] Filed: Dec. 9, 1992

[51] Int. Cl.[5] .............................................. F16D 65/12
[52] U.S. Cl. ................................. 188/218 XL; 188/18 A
[58] Field of Search ......... 188/218 XL, 250 D, 250 G, 188/264 A, 264 AA; 192/107 R, 107 C

[56] References Cited

U.S. PATENT DOCUMENTS

| | | | |
|---|---|---|---|
| 2,396,153 | 3/1946 | Butler | 188/218 XL |
| 2,477,500 | 7/1949 | Tack | 188/218 XL |
| 2,603,316 | 7/1952 | Pierce | 188/218 XL |
| 2,769,512 | 11/1956 | Tack | 188/218 XL |
| 2,844,229 | 7/1958 | Whitfield | 188/218 XL |
| 3,483,953 | 12/1969 | Beuder | 188/218 XL |
| 3,726,374 | 4/1973 | Warren et al. | 188/218 XL |
| 3,730,304 | 5/1973 | Buyze | 188/264 AA |
| 4,212,376 | 7/1980 | Enright et al. | 188/218 XL |
| 4,821,860 | 4/1989 | Crawford et al. | 192/107 C |
| 4,858,731 | 8/1989 | Bush | 188/218 R |
| 5,076,410 | 12/1991 | Maycock et al. | 192/107 R |
| 5,184,663 | 2/1993 | Oono et al. | 188/218 XL |

FOREIGN PATENT DOCUMENTS

| | | | |
|---|---|---|---|
| 1425317 | 10/1968 | Fed. Rep. of Germany | 188/218 XL |
| 656769 | 10/1963 | Italy | 188/218 XL |

Primary Examiner—Robert J. Oberleitner
Assistant Examiner—Chris Schwartz
Attorney, Agent, or Firm—Harness, Dickey & Pierce

[57] ABSTRACT

A composite brake rotor for a motor vehicle wheel assembly. The rotor includes an annular braking plate having a braking friction surface and at least one reinforcement ring cast so as to extend circumferentially within the braking plate. The reinforcement ring provides structural reinforcement to the braking plate thereby inhibiting checking and crack formation in the rotor.

8 Claims, 1 Drawing Sheet

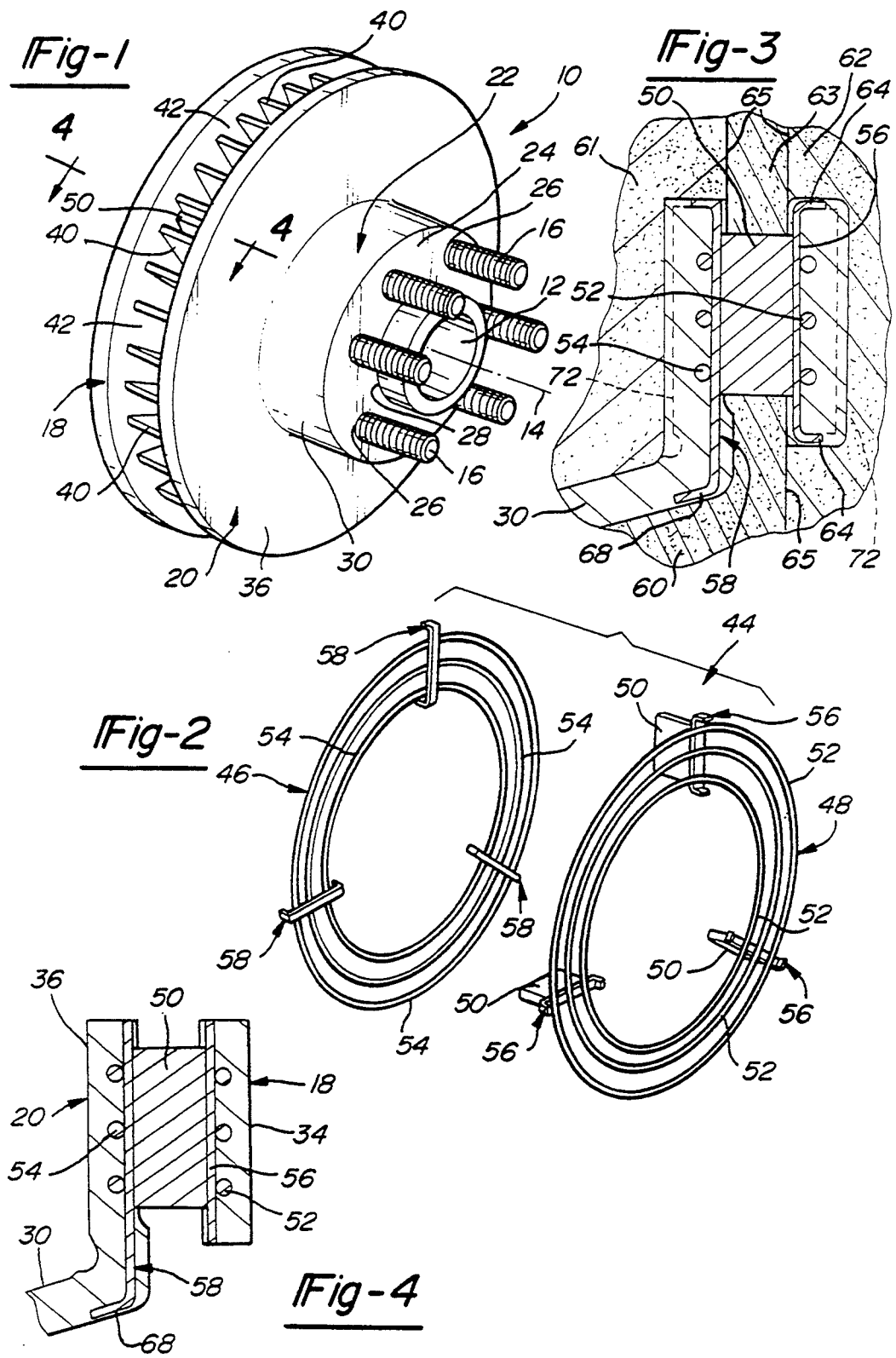

REINFORCED BRAKE ROTOR

BACKGROUND AND SUMMARY OF THE INVENTION

This invention relates generally to a vehicle brake assembly and more particularly to a composite brake rotor having a reinforcement assembly integrally cast within the brake disks of the assembly.

Generally, brake rotors include spaced apart plates adapted to be engaged by brake pads. The brake pads themselves do not form part of the rotor, but rather are part of a brake caliper assembly. The brake plates are typically provided in pairs which are connected together and maintained in a spaced apart relationship to each other by vanes. Cooling passages are formed between adjacent vanes to allow for air flow between and across both of the braking plates during rotation of the assembly preventing excessive heat buildup in the assembly. These types of brake rotors are generally known as ventilated rotors.

During actual use, the plates of the rotor are compressed between the brake pads mentioned above. Obviously, a significant compressive braking force must be generated by the brake caliper assembly in order to stop the vehicle. The repeated application of these compressive loads, along with braking torque, and in conjunction with the heat generated by the friction between the brake pads and disks, results in checking and crack formation in the brake disk which are undesirable.

As can be seen from the above discussion, a brake rotor which overcomes the limitations of the current designs, in general, and which succeeds in stopping the propagation of checking and crack formation, in particular, is desirable. This is the primary object of the present invention. While accomplishing the above object, the present invention seeks not only to provide a brake rotor which exhibits enhanced structural capabilities, but one which is also efficient in terms of both production time and cost.

In achieving the above and other objects, the present invention provides a cast brake rotor. The cast brake rotor of this invention is a composite structure having a reinforcement assembly integrally cast within the braking plates. The reinforcement assembly includes a series of loops or generally annular rings which are positioned within the annular plates so as to extend internally therearound. The reinforcement assembly is also provided with a means for accurately locating the rings within a casting mold cavity while maintaining them in spaced apart positions, relative to each other, during casting.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a perspective view of a brake rotor embodying the principles of the present invention;

FIG. 2 is an exploded perspective view of the reinforcement assembly utilized in the present invention;

FIG. 3 is a sectional view through a mold cavity illustrating the reinforcement assembly positioned in the mold; and FIG. 4 is a sectional view taken substantially along line 4—4 in FIG. 1 through a portion of a finished brake rotor embodying the principles of the present invention.

DETAILED DESCRIPTION OF THE PREFERRED EMBODIMENTS

Referring now to the drawings, a brake rotor 10 is generally shown in FIG. 1 as being mounted to the hub of a wheel assembly. The hub is rotatably supported by a vehicle steering knuckle (not shown) which is in turn connected to various suspension components (not shown) of the vehicle. The hub includes a generally axially extending cylindrical sleeve 12 and is rotatable about an axis of rotation 14. Extending radially outward from the sleeve 12 is a radial wheel mounting flange (not shown). Equidistantly spaced wheel mounting studs 16 extend from the wheel mounting flange so as to be oriented generally parallel to the axis of rotation 14.

As will become apparent from the discussion that follows, the rotor 10 of the present invention is a cast composite structure having a mounting portion 22 and a pair of braking plates, designated as inboard braking plate 18 and outboard braking plate 20. If desired, a single braking plate could be used. The mounting portion 22 includes a first radially extending face 24 in which a plurality of spaced apertures 26 are defined for receiving the wheel mounting studs 16 and mounting the rotor 10 onto the hub. A central aperture 28 is also defined in the face 24. The sleeve 12 of the hub extends through the aperture 28 when the rotor 10 is mounted on the hub. The mounting portion 22 also includes an interconnecting web 30 that extends from the outer perimeter of the face 24 to the outboard braking plate 20. While, the interconnecting web 30 can be oriented so as to extend generally parallel to the rotational axis 14, in the illustrated embodiment, the interconnecting web 30 has a generally diverging or frusto-conical shape.

The inboard and outboard braking plates 18 and 20 are generally shaped as planar rings and are adapted to be engaged by the brake pads of a brake caliper assembly (not shown). The inboard braking plate 18 includes an inboard face 32 which defines an inboard braking friction surface 34 of the rotor 10. Similarly, the outboard braking plate 20 includes an outboard face 36 defining an outboard friction braking surface 38. The inboard and outboard friction braking surfaces 34 and 38 thus respectively designate parallel planes which are perpendicular to the rotational axis 14.

Radial webs or vanes 40 extended between and interconnect the inboard and outboard braking plates 18 and 20 while maintaining them in their spaced apart relationship. The vanes 40 are themselves equidistantly and circumferentially spaced apart from one another and define radially extending cooling passages 42 between each adjacent vane 40. The cooling passages 42 radiate from the axis of rotation 14 and cause cooling air to flow radially outward between the plates 18 and 20 of the rotor 10 as it is rotated. The cooling air enters the passages 42 at the radially inward openings of the passages 42, adjacent to the inner periphery of the braking plates 18 and 20, and flows outward through the passages 42 exiting at the outer periphery of the plates 18 and 20.

As seen in FIGS. 3 and 4, a reinforcement assembly 44 is integrally cast within the rotor 10. The reinforcement assembly 44 is also shown separately in the exploded view of FIG. 2.

The reinforcement assembly 44 is made up of an inboard cage 46 and an outboard cage 48 which are connected together by a rib 50. The inboard and outboard cages 46 and 48 are generally similar to one another and are respectively embedded within the inboard and outboard braking plates 18 and 20 during the casting of the rotor 10.

The inboard cage 46 includes three coaxial continuous rings 52, each of which has a different diameter. Likewise, the outboard cage 48 includes three coaxial annular rings 54 of differing diameters. Alternately, the cages 46 and 48 could be shaped in a series of continuous loops or a spiral configuration.

Spacers 56 and 58 are mounted equidistantly around the sets of rings 52 and 54 and extend radially thereacross so as to maintain each set of rings 52 and 54 in a common plane and generally equidistantly spaced from one another. With the cages 46 and 48 cast within the inboard and outboard braking plates 18 and 20, it can be seen that the rings 52 and 54 will extend circumferentially around and within their respective braking plates 18 and 20.

As mentioned above, the spacers 56 and 58 are equidistantly positioned around the rings 52 and 54. This not only helps in balancing the rotor 10, but it also ensures that the ribs 50 can extend between and connect opposing spacers 56 and 58 to each other. Welding or other conventional methods can be used to secure the rings 52 and 54, ribs 50 and spacers 56 and 58 together.

In the preferred embodiment, the rings 52 and 54 are metal and constructed from round wire stock which is bent into a closed ring by having its ends butt welded together. If desired, the rings 52 and 54 can be made from other materials and other types of stock. One such construction might use rectangular bars bent into annular configurations.

The rotor 10 is constructed by locating the reinforcement assembly 44 on a core 60 which is in turn positioned relative to one half of a casting mold 61. This is best seen in FIG. 3. With the core 60 positioned relative to the mold half 61, the outboard cage 48 is located within the cavity of the mold 61 which defines the outboard braking plate 20. The remaining half of the casting mold 62 is then positioned over the core 60 so as to enclose the reinforcement assembly 44 within the mold cavity. When the mold halves 61 and 62 are closed, the inboard cage 46 is positioned and located by the spacers 56 and 58 within that portion of the mold half 62 which defines the other braking plate 18. The molten material used for forming the cast rotor 10 is then poured into the mold cavity encapsulating the reinforcement assembly 44 during the process. In the interest of clarity, the various mold parting lines 65 are also designated in FIG. 3.

To allow for positioning the reinforcement assembly 44 on the core 60, the assembly 44 is formed with or constructed on the core 60 itself. As seen in FIG. 3, the core 60 includes radially extending portions 63 which correspond to the cooling passages 42 of the rotor 10. In this first embodiment, the ribs 50 are formed on the core 60 and are actually positioned within these radial portions 63. The cages 46 and 48 are attached to the axial edges of the ribs 50. When constructed as discussed above, the resulting rotor 10 will have each of the three ribs 50 respectively positioned between two of the vanes 40.

In another embodiment of the present invention, instead of the ribs 50 being positioned between two adjacent vanes 40, the ribs 50 are constructed on the core 60 so as to actually replace three of the vanes 40 in the finished rotor 10. In forming this embodiment, each rib 50 is mounted on the core 60 at a location between two of the radial portions 63, in the space which ordinarily defines a vane 40, thus allowing the ribs 50 to replace three of the vanes 40 in the finished rotor 10. This embodiment has the benefit of not reducing or obstructing the flow of cooling air across any portion of the braking plates 18 and 20.

Alternatively, the rotor 10 can be formed without any ribs 50 at all. In this ribless embodiment, the outboard cage 46 is located by the spacers 58 directly off of the mold half 61 and positioned within those portions which define the outboard plate 20. The core 60 is still positioned with respect to mold half 61. The inboard cage 46, however, is located by its spacers 56 off of mold half 62 and positioned within the portion defining in inboard plate 18.

To enable the reinforcement assembly 44 to be located off of the casting molds 61 and 62 as in the third embodiment, the ends of the spacers 56 and 58 are provided with locators or feet that contact and rest against those surfaces of the casting molds 61 and 62 defining the mold cavity and, in particular, the plates 18 and 20.

As seen in FIG. 3, the portions of the mold cavity which define the inboard braking plate 18 are generally rectangular in cross-section. The feet of the spacers 56, hereinafter feet 64, are therefore bent approximately ninety degrees (90°) from the body of the spacers 56 (the body being that portion of the spacers 56 which extends across the rings 52 and keeps the rings 52 spaced apart) generally parallel to the axis 14 of the rotor 10. Bent in this manner, a length of the feet 64 will be in surface-to-surface contact with a corresponding surface length of the casting molds 62.

The feet of the spacers 58 utilized with the outboard cage 48 operate to position the outboard cage 48 within the mold 61 in a similar manner. The feet 67 formed radially outward on the spacers 58 are oriented like the feet 64 discussed above. However, the feet 68 located radially inward on the spacers 58 are angled, relative to the body of the spacers 58, so as to correspond with and, if desired, engage the surface of the core 60 which defines the interconnecting web 30 of the mounting portion 22. Providing the feet 64, 67 and 68 as described above, enables the rings 52 and 54 of the reinforcement assembly 44 to be accurately located within the mold cavity relative to the raw casting surfaces of the rotor 10.

After the raw casting has hardened, it is removed and separated from the core 60 and the casting molds 61 and 62. The raw casting surfaces of the inboard and outboard friction braking surfaces 34 and 36 are then machined to their appropriate dimensions. With the reinforcement assembly 44 and the rings 52 and 54 cast within the plates 18 and 20 at a known distance from the raw casting surfaces of the friction braking surfaces 34 and 36, machining can be easily controlled to provide proper spacing between the finished surfaces 34 and 36 and the rings 52 and 54 of the reinforcement assembly 44 in the finished rotor 10. The finished dimensions are generally shown as dash lines 72 in FIG. 3.

While the above description constitutes the preferred embodiments of the present invention, it will be appreciated that the invention is susceptible to modification, variation and change without departing from the proper scope and fair meaning of the accompanying claims.

What is claimed is:

1. A reinforcement assembly for incorporation into a brake rotor for a motor vehicle, said brake rotor having an annular braking member defining an axis of rotation and including axially spaced annular outboard and inboard braking plates, said braking plates each having a friction surface and being cast within a casting mold, said reinforcement assembly comprising:

a plurality of outboard rings, said rings being substantially concentric, radially spaced apart from one another and lying in a common plane with one another;

at least one outboard spacer extending radially and being connected to said plurality of outboard rings to maintain said outboard rings spaced from one another, said outboard spacer including means for locating said plurality of outboard rings within said casting mold to embed said outboard rings in said outboard braking plate spaced from said friction surface of said outboard braking plate;

a plurality of inboard rings, said inboard rings being substantially concentric, radially spaced apart from one another and lying in a common plane with one another;

at least one inboard spacer extending radially and being connected to said plurality of inboard rings to maintain said inboard rings spaced from one another, said inboard spacer including means for locating said inboard rings within said casting mold to embed said inboard rings in said inboard braking plate spaced from said friction surface of said inboard braking plate; and at least one connecting rib extending axially between and connected to said inboard and outboard rings.

2. A reinforcement assembly as set forth in claim 1 wherein said assembly includes three inboard rings and three outboard rings.

3. The reinforcement assembly of claim 1 further comprising a casting core encapsulating said connecting ribs and carrying said inboard and outboard rings for placement in a casting mold to support said inboard and outboard rings within the casting mold.

4. A composite brake rotor for a brake assembly of a motor vehicle having a rotatable wheel and hub, said rotor comprising:

mounting means for mounting said rotor to said hub of said motor vehicle;

a generally annular braking member defining an axis of rotation for said rotor, said braking member including a generally annular outboard braking plate having an outboard braking friction surface, said braking member also including a generally annular inboard braking plate having an inboard braking friction surface, said inboard braking plate being connected by a plurality of vanes to said outboard braking plate and being spaced apart therefrom such that said inboard and outboard braking friction surfaces are substantially parallel to each other;

an interconnecting web extending between and connecting said mounting means with said braking member; and a reinforcement assembly integrally cast within said braking member, said reinforcement assembly including three outboard rings embedded within said outboard braking plate, said reinforcement assembly also including three inboard rings embedded within said inboard braking plate, inboard and outboard radial spacers connected to said inboard and outboard rings respectively for radially spacing said rings apart within said braking plates and connecting ribs extending axially between and connected to said inboard and outboard rings for axially spacing said inboard rings from said outboard rings, said spacers and said connecting ribs maintaining said inboard and outboard rings at predetermined positions relative to said braking friction surfaces.

5. A composite brake rotor as set forth in claim 4 wherein said outboard rings are coaxial and lay substantially in a plane and said inboard rings are also coaxial and lay substantially in a plane.

6. A cast composite brake rotor for a motor vehicle, said rotor being cast within a casting mold and comprising:

means for mounting said rotor to said motor vehicle;

a generally annular braking member, said braking member defining an axis of rotation for said rotor and including a generally annular outboard braking plate having an outboard braking friction surface, said braking member also including a generally annular inboard braking plate having an inboard braking friction surface, said inboard braking plate being connected to said outboard braking plate and being maintained in spaced apart relation therefrom by a plurality of vanes, said inboard and outboard braking friction surfaces being substantially parallel with one another, said annular braking member being cast within said casting mold;

a reinforcement assembly having an outboard cage and an inboard cage, each of said cages having a plurality of reinforcement rings with said outboard cage being completely encapsulated within said outboard braking plate and said inboard cage being completely encapsulated in said inboard braking plate, said reinforcement assembly including multiple spacers for maintaining the rings of each cage radially spaced apart from one another and said reinforcement assembly having multiple connecting ribs extending axially between and connecting said inboard cage to said outboard cage, said radial spacers and said axial connecting ribs maintaining said inboard and outboard cages spaced relative to said inboard and outboard braking friction surfaces respectively; and an interconnecting web extending between and connecting said mounting means with said braking member.

7. A composite brake rotor as set forth in claim 6 wherein said outboard and inboard braking plates each include three radially spaced apart reinforcement rings.

8. A composite brake rotor as set forth in claim 7 wherein said three reinforcement rings in said inboard braking plate are positioned substantially in a common plane and said three reinforcement rings in said outboard braking plate are positioned substantially in a common plane.

* * * * *

UNITED STATES PATENT AND TRADEMARK OFFICE
CERTIFICATE OF CORRECTION

PATENT NO. : 5,358,080
DATED : October 25, 1994
INVENTOR(S) : Edgar E. Donabedian It is certified that error appears in the above-indentified patent and that said Letters Patent is hereby corrected as shown below:

Column 6, Line 46, Claim 6 after "ing" delete "fibs" and insert --ribs--.

Signed and Sealed this

Twenty-fourth Day of January, 1995

Attest:

BRUCE LEHMAN

Attesting Officer

Commissioner of Patents and Trademarks